B. J. PORTER & T. H. BINNINGTON.
WATER COCK OR FAUCET.
APPLICATION FILED NOV. 14, 1908.
932,172.
Patented Aug. 24, 1909.
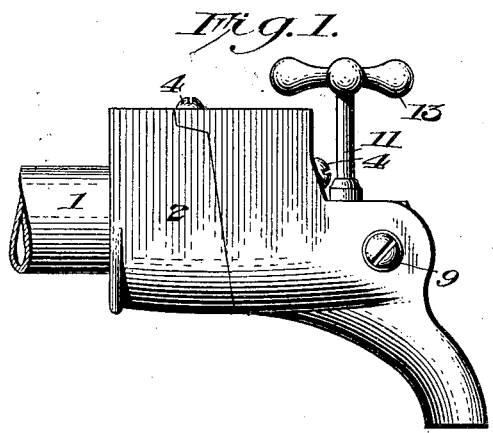
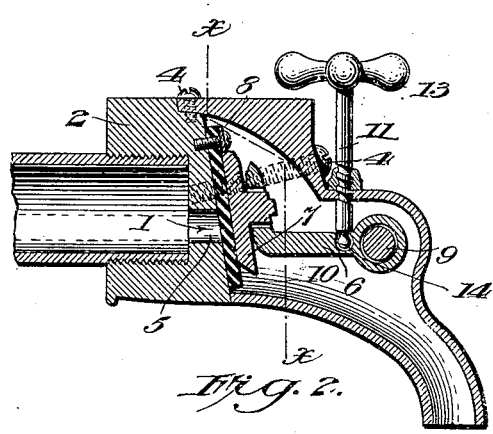
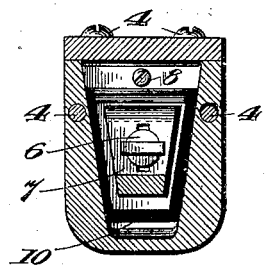
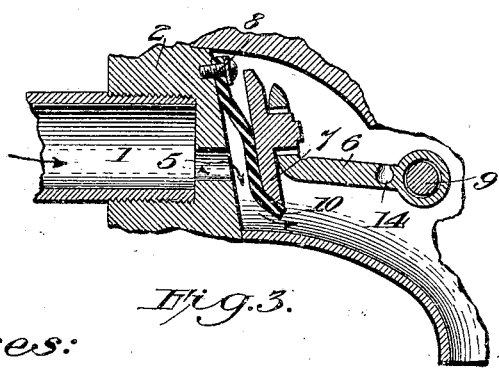

UNITED STATES PATENT OFFICE.

BENJAMIN J. PORTER AND THOMAS H. BINNINGTON, OF SALT LAKE CITY, UTAH.

WATER COCK OR FAUCET.

932,172.   Specification of Letters Patent.   Patented Aug. 24, 1909.

Application filed November 14, 1908. Serial No. 462,729.

*To all whom it may concern:*

Be it known that we, BENJAMIN J. PORTER and THOMAS H. BINNINGTON, citizens of the United States, residing at Salt Lake City, in the county of Salt Lake and State of Utah, have invented certain new and useful Improvements in Water Cocks or Faucets, of which the following is a specification.

The purpose of our invention is to provide a water cock or faucet that is simple in construction and yet positive in its operation of cutting off the water and is used where the force of water is strong. This we do by the device illustrated in the accompanying drawings in which:

Figure 1 is an outside elevation of the device as a faucet. Fig. 2 is a vertical section of the device as a faucet closed. Fig. 3 is a vertical section of the faucet open, the arrows showing the direction of the water, parts cut away. Fig. 4 is a vertical section on line $x$, $x$, of Fig. 3.

Our invention is used in connection with a water pipe 1, which may be threaded to enter the faucet as shown in the drawing or it may be that the faucet may be threaded to enter the water pipe.

The casing 2 has its interior hollowed out, within which is fitted the valve 10, the adjustable bearing plate 7 and the valve lever 6. And leading from the water pipe opening, to the interior of the casing is the water passage 5. The interior of the casing 2 adjacent to the water passage 5, is formed or beveled at an angle near 80 degrees. The valve lever 6 is fulcrumed by a screw 9 passing therethrough, and threaded at one end to enter the side of the casing 2, and the head of said screw 9 is seated in the other side. One end of the valve lever 6, is provided with an adjustable bearing plate 7, that adjusts itself to the angle of the body of the casing 2 adjacent to the water passage 5. Between said adjustable bearing plate 7 and the body of the casing 2 and secured thereto is fitted said valve 10, held in place by screw 8, or this valve may be secured or fastened on the adjustable bearing plate 7, instead of on the casing as shown.

The casing 2 is cut in two at an angle of about 80 degrees. The two parts of the faucet or casing 2 are held together by screws 4. The body of the casing may be held together by cutting threads on one part and inner threading the other and screwing them together. One end of the valve lever 6, is fitted to hold an adjustable bearing plate 7. Between the fulcrum of the valve lever 6 and the end that holds the said adjustable bearing plate 7, is provided a seat 14 for the end of the screw plunger 11. Said screw plunger 11 enters the faucet through an opening in the top thereof that is threaded with threads which mesh with the threads of the screw plunger 11. The upper end of the screw plunger 11 is fitted with a lever handle 13. The operation of the faucet is as follows: The pressure of the water against the valve 10 when the adjustable bearing plate 7 is released, will force the valve 10 away from the body 2 and allow the water to flow. Desiring to close the faucet, the handle is turned, and the threads of the screw plunger will force the valve lever down, and the adjustable bearing plate by reason of its adjustability will force and hold the valve 10 tightly over the water passage 5, and cut off the flow of the water.

Having thus described our invention we desire to secure by Letters Patent.

In a device of the class described the combination of, a casing having its interior hollowed out and one portion of the walls of said interior cut at an angle near 80 degrees, a water passage through said casing near the center of said angle cut, a flexible valve fitted over said water passage, with a lever having one end fitted to hold a bearing plate in contact with said valve, an adjustable bearing plate made to operate on the end of said lever, and a threaded plunger having the lower end swivelly fitted in said lever, as and for the purposes described.

In testimony whereof we have affixed our signatures in presence of two witnesses.

BENJAMIN J. PORTER.
THOMAS H. BINNINGTON.

Witnesses:
W. E. WOOD,
THOMAS BUTTERWOOD.